No. 827,172. PATENTED JULY 31, 1906.
J. C. McLACHLAN.
DESICCATING APPARATUS.
APPLICATION FILED OCT. 8, 1903.
2 SHEETS—SHEET 2.
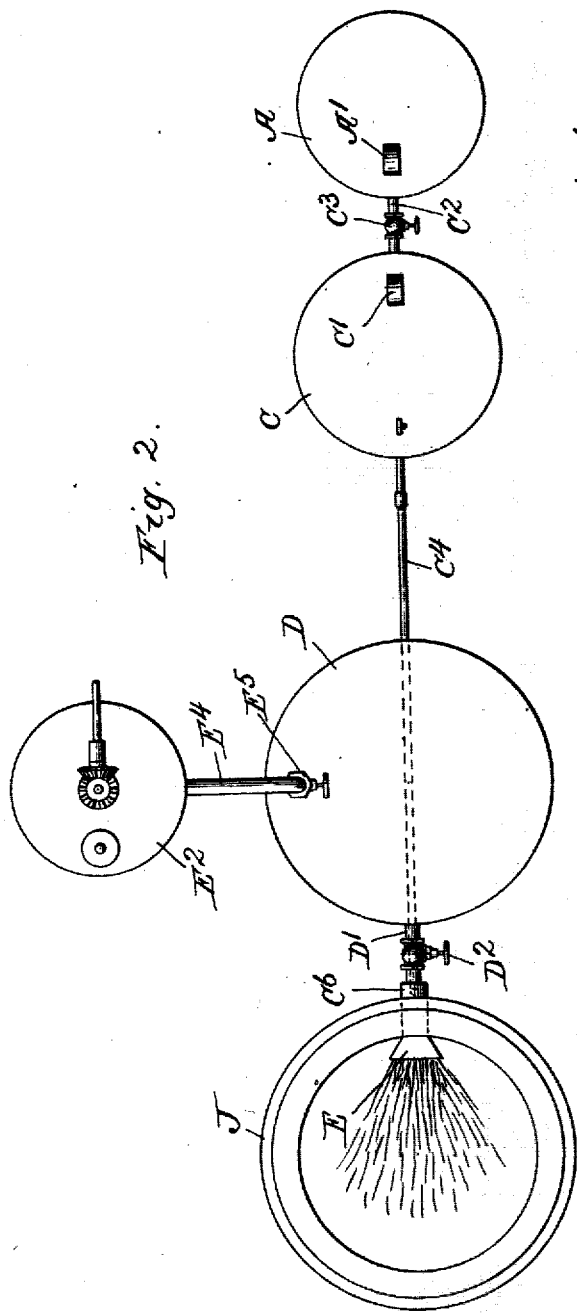
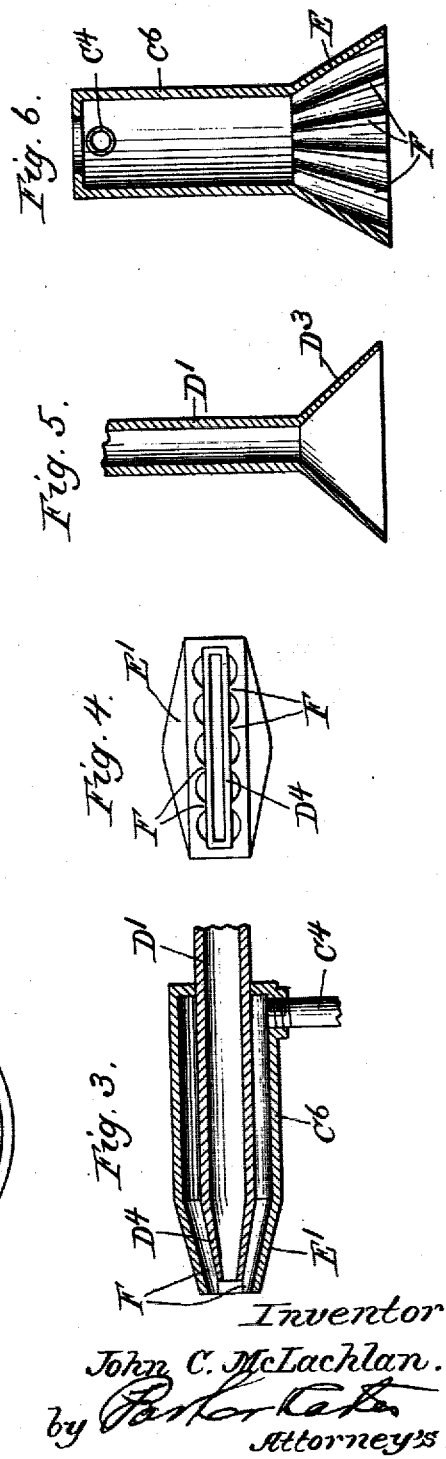
Witnesses
Edward T. Wray
Howard L. Kraft
Inventor.
John C. McLachlan.
by Parker & Parker
Attorneys.

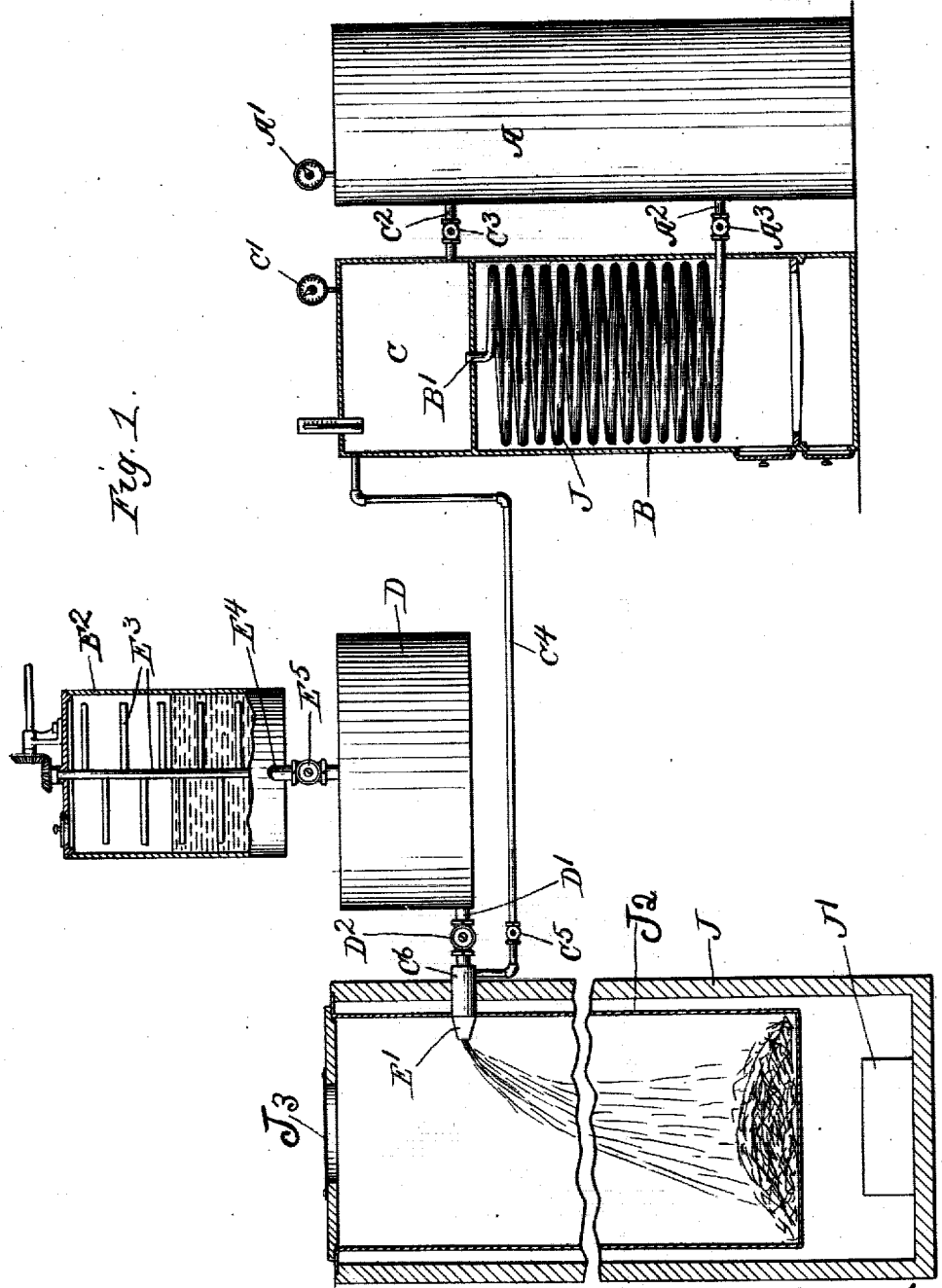

UNITED STATES PATENT OFFICE.

JOHN C. McLACHLAN, OF CHICAGO, ILLINOIS.

DESICCATING APPARATUS.

No. 827,172.  
Specification of Letters Patent.  
Patented July 31, 1906.

Application filed October 8, 1903. Serial No. 176,199.

*To all whom it may concern:*

Be it known that I, JOHN C. McLACHLAN, a citizen of the United States, residing at Chicago, in the county of Cook and State of Illinois, have invented a certain new and useful Improvement in Desiccating Apparatus, of which the following is a specification.

My invention relates to a machine or apparatus for producing powdered food and other like products from liquid, and one form is illustrated in the accompanying drawings, wherein—

Figure 1 is an elevation with parts shown in dotted lines. Fig. 2 is a plan view of the same with parts removed. Figs. 3, 4, 5, and 6 are details of the atomizer.

Like parts are indicated by the same letter in all figures.

A is a compressed-air tank in which a suitable supply of air or other fluid is kept.

A' is a gage to indicate the pressure. The apparatus for compressing the air is not shown.

$A^2$ is a pipe controlled by the valve $A^3$ and leading from the lower part of the tank A to the heater B. Thence the air escapes through the pipe B' into the hot-air chamber C, provided with the gage C'. The hot-air chamber is also connected with the compressed-air chamber by the pipe $C^2$, which is controlled by the valve $C^3$. From the hot-air chamber C leads the pipe $C^4$, controlled by the valve $C^5$, to the outer shell $C^6$ of the atomizer.

D is a tank which contains the substances to be treated in a liquid form. From this leads the pipe D', controlled by the valve $D^2$. The extreme end of the pipe D' forms the inner portion of the atomizer. It is outwardly flaring, as indicated at $D^3$, and its outer lips are brought together, as indicated at $D^4$. In like manner the outer portion of the atomizer has its extremity flaring, as indicated at E, and its lips drawn together, as indicated at E'. The outer portion of the atomizer is provided with a series of ribs F.

J is the heating-chamber. This chamber may be heated in any desired manner—as, for example, by extending the coil J from the heater B or by leading the hot air from the pipe $C^4$ about this chamber instead of discharging it into the chamber or by the heater J'. In other words, any desired means may be employed.

I have indicated diagrammatically a heater J' in the chamber J and shown an inner well-like receptacle $J^2$ within the chamber J, into which the powdered material falls. There is an opening $J^3$ at the top of the inner chamber $J^2$, through which the vapor driven off may escape. This opening may be left free or covered with a wire-gauze. In the drawings the chambers J and $J^2$ are shown as broken, which is meant to indicate that they are of relatively greater length or depth than shown in the drawings. The chamber $J^2$ is well-like, being closed at the bottom, so as to avoid the introduction of currents of air and to permit the solids to fall and collect in the bottom. Means for removing them, of course, must be provided; but in operation the preferred form is, as indicated, a well-like chamber closed at the bottom and in all its lower parts, but open near the top, so that the vapors can escape from the top and the solids be collected in the shape of a dry powder at the bottom. Of course the length of this chamber will vary according to the degree of heat employed and the character of the material. Thus a material charged with a large per cent. of water and subjected to relatively low heat—as, for example, such heat as the sun would impart to the chamber $J^2$—would necessarily fall a considerable distance, whereas had it much less moisture and were the heat much greater than last stated the fall could be reduced. In any event the length of the chamber below the point where the material is introduced must be such that the material will eventually escape from the vapor-charged area and be deposited in a dry powdery form at the bottom of the chamber.

The material to be treated, if it is composed of two substances—as, for example, milk and eggs—may be mixed in the mixing-tank $E^2$, which contains the stirring device $E^3$, driven in any desired manner, whence leads the pipe $E^4$, controlled by the valve $E^5$, to the fluid-tank D.

In one form of my device the air injected through the atomizer will be heated so that the material to be treated when it is atomized will be desiccated; but the steam or vapor still remains to be disposed of, and hence in such preferred form of my apparatus there is an additional heating-chamber whereby such vapors or gases are driven off. Thus the well-like chamber $J^2$ may be heated in any desired manner, either by placing it within a heating-chamber, as shown, or subjecting it in any manner to external heat or by introducing currents of hot air into it through the atomizer or otherwise, and the atomizing or spraying of the material may be accomplished in any desired manner by hot or cold air and by air supplied in any desired way.

It will be evident that these parts are to be considered as in a sense diagrammatic and that they could be greatly varied without departing from the spirit of this invention. I have shown one form, and that only in part, but sufficient to illustrate a complete operative apparatus such as I have used.

The chamber $J^2$ is preferably a closed chamber, so that there will be no introduction of air or currents of air therethrough other than such as are introduced by the entrance of material to be treated; but it is open at the top, as indicated, for the escape of vapor. This chamber is of relatively great length and of such a length as to permit the solids to flow downwardly by the action of gravity until they are freed from vapor, the particles of vapor being successively detached from the particles of such material, the vapor passing upwardly and particles of the material downwardly. The length of the chamber must be such that by this action the particles of the material will eventually escape from the vapor-charged area and fall as fine dry powder in the bottom of this inner receptacle. Of course any device for atomizing could be used so far as this feature of the invention is concerned, and the air used for atomizing, if such an atomizer as that shown is used, could be either hot or cold. The temperature of the air, if such is used to force the materials in, and the temperature of the inner chamber $J^2$ must be such as not to cook or coagulate the albuminoids. In other words, the temperature must be relatively low.

The use and operation of my invention are as follows: A quantity of compressed air is kept in the compressed air or storage tank A at any desired temperature. This air is allowed to enter the heating-tank, where it is heated to any desired temperature. It then passes into the hot-air chamber. Here it is kept ready for action. The temperatures are variable. Where delivered to the atomizer, the air must be at a temperature which will not cook the materials or coagulate the albuminoids. It will be understood that I may use this air to dry the material at the same time that it atomizes it, or I may use it simply to atomize and then effect the drying process later. In the latter case the drying in the apparatus shown would take place in the tank $J^2$ and the air in such tank would be heated in any desired manner, preferably by external application of heat. If the hot air is used in the atomizer to atomize and desiccate the solid materials, then under ordinary conditions it would be desirable to have the further heating process carried out in the chamber $J^2$, so as to drive off the vapors. The materials to be treated are, if that is necessary, stirred and mixed in the tank $E^2$ and then led into the liquid-tank D. By operating the valves properly the two fluids will pass simultaneously through the atomizer and the materials to be treated will be atomized, and if the temperature conditions are proper the same will be deposited as a dry powder. The products of combustion are carefully excluded and the temperatures kept at a point where there will be no cooking or coagulation of the albuminoids. The peculiar shape of the atomizer at its discharging end obviously facilitates the atomizing of the materials.

My apparatus can be used with air of any temperature in an atomizer and heat of any temperature about the chamber, or the drying can be effected partly by the drying effect of air introduced through the atmosphere and by heat applied to the chamber. It can be used with a large variety of liquid materials to produce therefrom in a powdery form the solids thereof practically free from moisture. I have employed it with milk, eggs, ox-gall, blood-serum, and other materials and mixtures of materials, and the products which I have obtained are always in the form of dry powders, like flour. I wish also to have it understood that in the use of the term "chamber" applied to the drying-chamber I mean not to confine myself to the particular form of chamber shown. For example, the vapor might obviously be carried away from the upper part of the chamber, though this latter should be shaped very differently from what is illustrated, and it is equally true that in a very differently shaped chamber the powdered material might be collected below. I therefore mean to use the term "chamber" in a broad sense having reference to any form or shape of a dry chamber which will permit the vapors to pass out upwardly and the solids to be collected downwardly, the latter to escape from the vapor-charged area when they are sufficiently freed from moisture.

I claim—

1. In an apparatus for producing in the form of a dry powder the solids from liquids, the combination of a vertically-extended chamber, closed in its lower portion so as to normally prevent currents of air and serve as a powder-collecting chamber, and open near its upper end to permit the escape of vapor, with means for discharging the material to be treated in a finely-divided state into the upper end of said chamber, below the vapor-discharge opening and above the closed portion of the chamber, and means for heating the contents of said chamber, the length of said chamber being such that the falling solids near the bottom of the chamber escape from the vapor-charged area.

2. In an apparatus for producing in the form of a dry powder the solids from liquids, the combination of a vertically-extended chamber, closed in its lower portion and open near its upper end, with means for discharging the material to be treated in a finely-divided state into the upper end of said chamber, and means for heating the contents of said chamber, the length of said chamber below where the material is introduced being such that the falling solids near the bottom of the chamber escape from the vapor-charged area.

3. In an apparatus for producing in the form of a dry powder the solids from liquids, the combination of means for leading the liquid products to an atomizer, means for supplying to such atomizer a current of hot air, a chamber into which the atomized products are discharged through such atomizer, said atomizer provided with a wide-spread discharge-mouth and distributing-ribs therein.

4. In an apparatus for producing in the form of a dry powder the solids from liquids, the combination of a vertically-extended chamber, closed in its lower portion so as to normally prevent currents of air and serve as a powder-collecting chamber, and open near its upper end to permit the escape of vapor, with means for discharging the material to be treated in a finely-divided state into the upper end of said chamber, below the vapor-discharge opening and above the closed portion of the chamber, and means for heating the contents of said chamber, the length of said chamber being such that the falling solids near the bottom of the chamber escape from the vapor-charged area, said means for discharging the material to be treated into the chamber comprising an atomizer with a supply source of hot air.

5. In an apparatus for producing in the form of a dry powder the solids from liquids, the combination of a vertically-extended chamber, closed in its lower portion and open near its upper end, with means for discharging the material to be treated in a finely-divided state into the upper end of said chamber, and means for heating the contents of said chamber, the length of said chamber below where the material is introduced being such that the falling solids near the bottom of the chamber escape from the vapor-charged area, said means for discharging the material to be treated into the chamber comprising an atomizer with a supply source of hot air.

6. In an apparatus for producing in the form of a dry powder the solids from liquids, the combination of a vertically-extended chamber adapted below to serve as a powder-collecting receptacle and to prevent currents of air within it and open above to permit the escape of vapor, with means for discharging the material to be treated in a finely-divided state into the upper end of said chamber below the vapor-discharge opening so that it can fall through said chamber to the powder-collecting receptacle, and means for heating the contents of said chamber, the vertical length of said chamber being such that the falling solids near the powder-collecting receptacle escape from the vapor-charged area.

7. In an apparatus for producing in the form of a dry powder the solids from liquids, the combination of a vertically-extended chamber adapted below to serve as a powder-collecting receptacle and to prevent currents of air within it and open above to permit the escape of vapor, with means for discharging into the upper portion of said chamber the materials to be treated in a finely-divided state so that it can fall through said chamber to the powder-collecting receptacle, and means for heating the contents of said chamber, the vertical length of said chamber being such that the falling solids near the powder-collecting receptacle escape from the vapor-charged area.

JOHN C. McLACHLAN.

Witnesses:
HOMER L. KRAFT,
EDGAR L. CONANT